June 13, 1961 F. E. BAKER 2,988,648
AUTOMATIC BATTERY CHARGING GENERATOR CONTROL CIRCUIT
Filed March 22, 1960
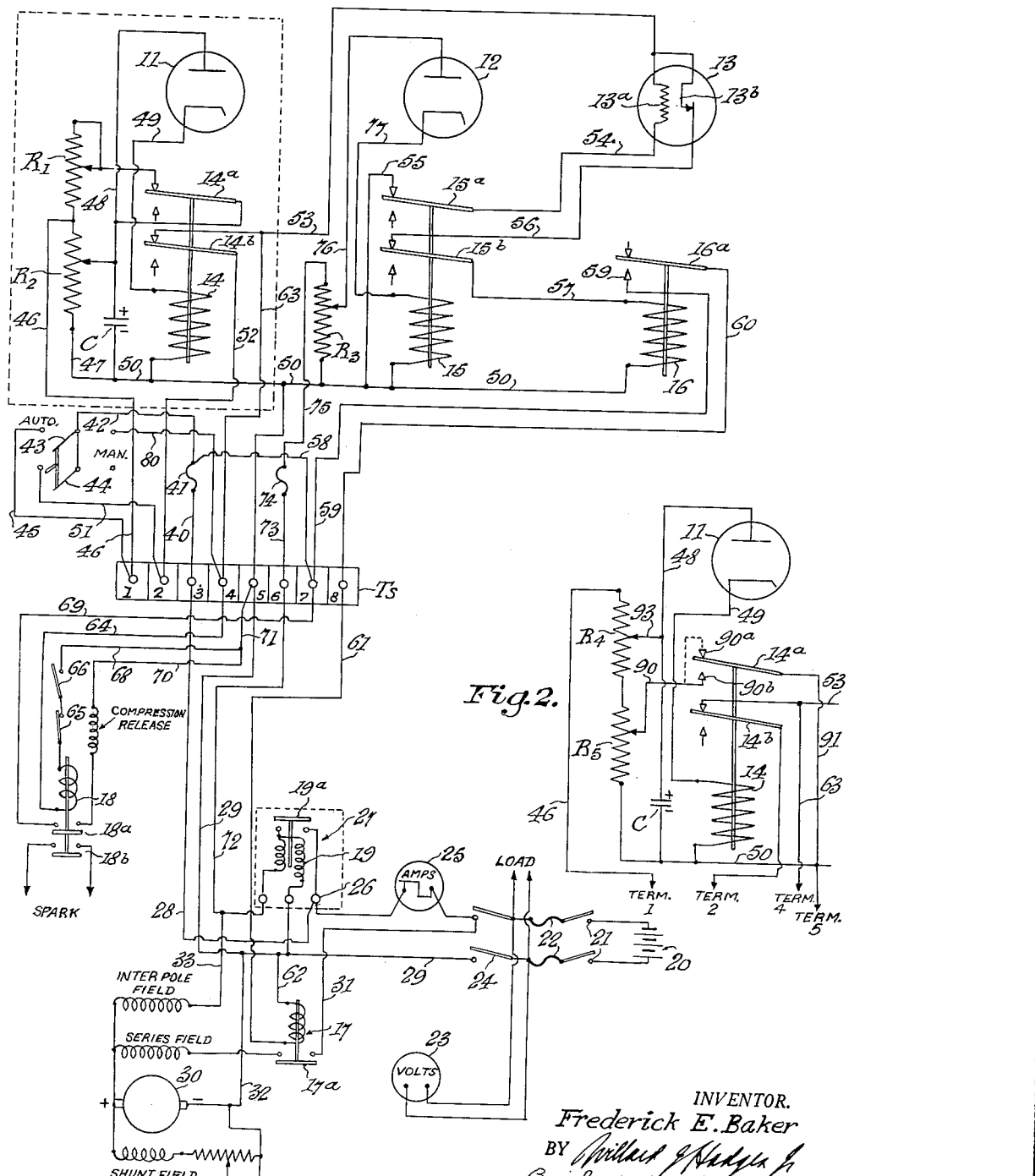
INVENTOR.
Frederick E. Baker
ATTORNEYS

United States Patent Office 2,988,648
Patented June 13, 1961

2,988,648
AUTOMATIC BATTERY CHARGING GENERATOR CONTROL CIRCUIT
Frederick E. Baker, Vancouver, Wash.
(Rte. 1, Box 808, Ridgefield, Wash.)
Filed Mar. 22, 1960, Ser. No. 16,899
5 Claims. (Cl. 290—30)
(Granted under Title 35, U.S. Code (1952), sec. 266)

The invention described and illustrated herein may be manufactured and used by or for the Government for governmental purposes without the payment of any royalty thereon.

The present invention relates to a control panel for an electrical generating system having a storage battery which is charged by a dynamo electric machine driven by an internal combustion prime mover. In particular, the present invention relates to a control panel for starting the charging operation of an engine driven dynamo to charge a battery when the voltage of the battery drops to a preselected low value, and to stop the charging operation of the dynamo when the battery voltage has been restored to a preselected high value, thereby maintaining the battery voltage within a desired range.

The object of the present invention is to provide an improved voltage control panel for automatic operation of a dynamo and associated storage battery which is more reliable and is unaffected by vibrations and temperature variations.

Another object of the present invention is to provide a control panel which can easily be adjusted to operate a dynamo and maintain the voltage of a battery within selected high and low limits, the limits being any of a wide range of voltage magnitudes and of any differential between the high and low voltage limits.

Additional objects and advantages will be apparent from the following detailed disclosure and accompanying drawings wherein:

FIG. 1 is a schematic electrical circuit diagram of a control panel in accordance with the present invention;

FIG. 2 is an alternative dual-valued resistance network and can be substituted for that portion of the circuit of FIG. 1 shown in dotted outline;

Referring now to FIG. 1, a storage battery 20, or any number of connected storage batteries, is connected directly to a load by customary manual switch contacts 21 and fuses 22. A voltmeter 23 is connected in shunt to the load to indicate the voltage of the battery. The positive side of the battery is connected to terminal 3 of the terminal strip TS by manual switch 24, ammeter 25, terminal 26 of current reversing relay 27, and conductor 28. The negative side of the battery is connected to terminal 5 of the terminal strip by conductor 29.

The armature 30 of a dynamo-electric machine is mechanically coupled to an internal combustion prime mover (not shown) and has conventional shunt, series and interpole field windings as shown. The dynamo operates as a motor to start the combustion prime mover when starting relay 17 is energized completing a circuit from the positive terminal of the battery through conductor 31, contactor 17a of the starting relay 17, the series field, armature, and shunt field, and through conductor 32 back to the negative battery terminal. Of course, a separate cranking motor could be employed if desired, but would be an unnecessary expense. When the prime mover is started and is driving the dynamo, current is generated and passes from the armature through the interpole field to conductor 33, through the coils of relay 19 and through conductors 29 and 32 back to the negative brush of the dynamo. When the coils 19 are energized, contact 19a closes and completes the charging circuit through the ammeter to the positive terminal of the battery, through conductors 29 and 32 back to the armature.

Tubes 11 and 12 are cold cathode gaseous filled tubes of the type which are non-conductive until the voltage applied thereto reaches a fixed high value at which point the tubes "fire" and commence to conduct. The tubes continue to fire and conduct even though the voltage subsequently decreases in magnitude until a certain lower voltage is reached at which time the tubes cease to conduct. For example, the tubes used in the present embodiment "fire" at 105 volts and cease firing at 65 volts. Once the tubes have ceased to conduct, they will not again conduct as the applied voltage increases until the high "firing" voltage is again reached.

The battery voltage is applied to tube 11 through terminal 3, conductor 40, fuse 41, conductor 42, switchblade 43, conductor 45, terminal 1, conductor 46 and to the junction of manually variable resistors $R_1$ and $R_2$. The network of these two resistors constitute a dual-value resistance or voltage divider which determines what proportion of the battery voltage is applied to the tube 11. The resistors are connected in parallel, one circuit being through the sliding contact of $R_1$, contactor 14a and back to conductor 48, the other circuit being through the sliding contact of $R_2$ direct to conductor 48. From conductor 48 the circuit is traced through tube 11, conductor 49, and coil 14 of a control relay to the negative terminal bar 50 which is connected to negative terminal 5 of the terminal strip and then to the negative side of the battery. A surge condenser C is placed between the conductor 48 and negative bar 50.

Whenever the voltage of the battery is sufficiently low that tube 11 is in the non-conducting or non-firing state, the coil 14 is de-energized and contactor 14a and 14b are in the normally closed positions as shown in FIGS. 1 and 2. Then an engine cranking circuit is completed from terminal 3 through conductor 40, fuse 41, conductor 42, switchblade 44, and conductor 51 to terminal 2, through conductor 52, contactor 14b, conductor 53 to the dual elements 13a and 13b of timer switch 13. The circuit divides and goes through bimetallic switch 13b, conductor 56, normally closed contactor 15b, conductor 57, and through coil 16 to negative ground bar 50. The other branch of the circuit is through heater coil 13a, conductor 54, normally closed contactor 15a, and conductor 55 to negative ground bar 50.

At the same time the circuit is completed through contactor 14b to the timer 13, a circuit is completed through conductor 63 to terminal 4 of the terminal strip, through conductor 64, combustion engine control relay coil 18, switchblades 65 and 66, and conductor 68 back to negative terminal 5. Switchblades 65 and 66 represent lubrication oil pressure and engine temperature switches respectively which open thereby stopping the engine under harmful operating conditions. When the relay coil 18 is energized, contact 18b closes the spark ignition circuit of the engine and contact 18a completes the circuit for the compression release solenoid which when energized closes the compression release valve. The engine is then ready for cranking. The circuit for the compression release solenoid is from positive terminal 3, through fuse 41, conductor 58, terminal 7, conductor 69, contact 18a, and back to negative terminal 5 by conductor 70.

When relay 16 is energized, a circuit is completed from positive terminal 7, through conductor 59, contactor 16a, conductor 60, terminal 8, conductor 61, starter solenoid 17, and conductors 62 and 29 to the negative terminal of the battery. When solenoid 17 is energized, normally open contact 17a closes and completes the cranking circuit to the dynamo which cranks the combustion engine. When the engine has started and is driving the generator, cranking is stopped by the circuit from the positive terminal of the armature through the interpole field to conductor 72, terminal 6, conductor 73, fuse 74, and conductor 75 to manually variable resistor $R_3$. The other end of the resistor is connected to negative ground bar 50. When the dynamo generates a sufficiently high voltage to "fire" tube 12, relay coil 15 is energized and normally closed contactor 15b opens, breaking the circuit to relay 16 which opens the cranking relay contact 17a.

Manual operation of the device is provided by closing the master switch so that switchblade 43 completes a circuit through conductor 80 to terminal 4. With the switchblade 43 in this position, the engine control relay 18 is energized which closes the spark circuit and the compression release valve, also, the cranking circuit through thermal timer 13 completed as before and the dynamo drives the engine. If the engine starts, the tube 12 fires and stops the cranking operation. If the engine fails to start, the thermal timer stops the cranking operation before any damage is done. However, since the circuit to the engine control relay 18 is completed whether the tube 11 is firing or not firing, the engine will continue to operate and drive the generator until switchblade 43 is opened.

FIG. 2 is an alternative connection for the dual value resistance network used to control that portion of the battery voltage which is to be applied to tube 11. When using the circuit of FIG. 2, the overall circuit operation is the same. However, conductor 46, which is ultimately connected to the positive battery terminal, is connected to manually variable resistors $R_4$ and $R_5$ which are connected in series relative to each other with the circuit completed to negative bar 50. The sliding contact of resistor $R_4$ is connected directly to conductor 48 and tube 11. The sliding contact of resistor $R_5$ is connected through conductor 90 to contact 90b, shown in solid line, in which case the contact 90a is disconnected and left open. Therefore, when the contactor 14a is in the up position, the circuit through the sliding contact is open. Or when the sliding contact on $R_5$ is connected to contact 90a by that portion of conductor 90 shown in dotted line, the contact 90b is left open. This in effect provides two modifications of the control circuit merely by connecting one wire (90) to either the contact 90a or to 90b, one modification providing a battery voltage differential greater than the normal differential between the firing and cease firing voltages of the tube, and the other contact providing a differential less than the normal differential of the tube.

*Operation*

Assume that the battery voltage is above the desired minimum allowable voltage and is discharging to the load. With this condition, the dynamo is idle and tube 11 is firing. As the battery voltage reaches the lower limit, the tube 11 ceases to fire and relay 14 is de-energized. Contactors 14a and 14b return to the normally closed position shown in FIG. 1. The circuit is completed through contactor 14b to the thermal timer 13 and, since contactor 15b is in the normally closed position when the dynamo is not generating, relay 16 is energized, closing contactor 16a. When relay 16 is energized, cranking relay 17 is energized which connects the battery voltage to the armature of the dynamo in a manner to drive the dynamo as a motor and crank the combustion engine. The engine control relay 18 was also energized when tube 11 ceased to fire and relay 14 closed. Therefore the spark ignition circuit including contact 18b is complete and the compression release valve is closed. When the engine starts and drives the generator at sufficient speed to generate a potential, the generated potential is applied to tube 12 through resistor $R_3$. When tube 12 fires, relay 15 is energized. Energization of relay 15 opens normally closed contactor 15a, which opens the circuit of heating coil 13a, and contactor 15b, which de-energizes relay 16, which in turn opens contactor 16a, which in turn opens the cranking relay contact 17a to stop the cranking cycle.

As the dynamo begins to generate a potential, the coils 19 of the reversing relay are energized and contactor 19a is closed which connects the armature directly to the battery. When the battery has been charged to the desired high voltage, the tube 11 fires and energizes relay 14 which opens the normally closed contactors 14a and 14b. When 14b opens, the engine control relay 18 is de-energized and contactors 18a and 18b are opened, which respectively release the compression and open the spark ignition circuit to stop the engine and hence the generating operation. So long as tube 11 continues to fire, contactors 14a and 14b remain open and the generator remains inactive. When the battery voltage reaches the selected minimum desired voltage, the tube 11 ceases to fire and the cranking and charging sequence is repeated.

In the event the engine malfunctions and will not start, thermal time delay relay 13 stops the cranking procedure to prevent overheating of the circuitry and unnecessary drain on the storage battery. Until tube 12 fires as a result of the dynamo commencing to generate a potential, contactor 15a remains closed and heater element 13a continues to heat. After a certain time delay, bimetallic contact 13b is heated sufficiently to warp and open the circuit through conductor 56, contactor 15b and relay coil 16. This opens the circuit to the cranking coil 17 and stops the cranking operation. So long as the switchblade 44 remains in the automatic position where the circuit is completed through conductor 51, terminal 2, conductor 52, contactor 14b and conductor 53 to the time delay relay, the heater element 13a continues to heat the contact 13b and maintains the cranking circuit open until the switchblade 44 of the master switch is returned to either the off or manual positions to interrupt the heater element circuit and sufficient time has passed for the contact 13b to cool and close the cranking circuit.

The surge condensor C is provided between conductor 48 and negative ground bar 50 to prevent false starts and stops of the engine. For example, if a large load is suddenly put across the battery by an automatic refrigerator, there will be a momentary drop in line voltage which would cause tube 11 to cease firing and start the cranking operation. However, since the condenser is charged, it will discharge and tend to maintain the voltage applied to tube 11 constant. Or if the engine is running and charging the batteries and a large load is suddenly removed, a voltage surge would be applied to the tube 11 causing it to fire thereby stopping the engine. However, the condenser absorbs the voltage surge and prevents the tube from firing, thereby providing stabilized operation.

The firing and cease firing voltages of tube 11 are fixed in magnitude and differential, for example at 105 and 65 volts, a 40 volt differential. However, it is usually desirable to maintain the voltage within, for example, the range of 130 and 110 volts, a differential of only 20 volts. The dual valued resistance which determines what portion of the battery voltage is to be applied to the tube 11 is comprised, in FIG. 1, of manually adjustable resistors $R_1$ and $R_2$. When contactor 14a is closed, the resistors $R_1$ and $R_2$ are connected in parallel and the total resistance is at the low value. When contactor 14a is open, resistor $R_1$ is dropped from the circuit and the total resistance is at its high value. Thus when the tube is not conducting, the resistance in series with tube 11 is at a minimum. The resistors are adjusted so that when 130 volts is connected across terminals 3 and 5 the applied voltage on the tube 11 will be 105 volts. When the tube 11 fires at 105 volts, relay 14 is energized and resistor $R_1$ drops out as contactor 14a opens. The dual value resistance immediately increases to its high value and the applied voltage to tube 11 decreases. A further decrease in the battery voltage to 110 volts results in an applied voltage of 65 volts and the tube 11 ceases to fire. Thus it is seen that by increasing the resistance in the circuit to tube 11 as the tube fires, the differential between the high and low battery voltages can be made smaller than the differential between the fire and cease fire voltages of tube 11.

It is very simple to adjust the dual value resistance of FIG. 1 to cause the tube 11 to fire when the desired high battery voltage is connected to terminals 3 and 5 of the terminal strip and to cease firing when the battery voltage has reached the desired low value. First the resistor $R_2$ is adjusted to its minimum value and a sufficiently high voltage applied to tube 11 to cause it to fire so that resistor $R_1$ is dropped from the circuit. Then the battery voltage is reduced to the desired low value and resistor $R_2$ is increased until the applied voltage on tube 11 is decreased sufficiently that the tube stops firing. Next, the resistor $R_1$ is adjusted to maximum resistance and the desired high battery voltage is applied to the terminals 3 and 5. The resistor $R_1$ is then decreased until the tube 11 fires. Then both the high resistance value ($R_1$ and $R_2$ connected in parallel) and the low resistance value ($R_2$ alone) of the dual value resistance are set and the panel is ready for automatic operation.

In the network of FIG. 2, a portion of the resistance is in parallel with the tube 11, that portion being the part of $R_4$ below the sliding contact 93 and all of resistor $R_5$. The highest value of the resistance occurs when the circuit through the sliding contact of $R_5$, conductor 90, contactor 14a and conductor 91 to negative ground bar 50 is open. However, since resistor $R_5$ is in parallel with the tube 11, when the total resistance in parallel with the tube is greatest, the voltage applied to the tube is also the greatest. When the total resistance in parallel with the tube is reduced by closing of contactor 14a, the voltage applied to tube 11 is also reduced.

The dual value resistance network of FIG. 2 serves the same function as the dual value resistance network of FIG. 1. That is, the resistance network determines what portion of the battery voltage is applied to the tube 11. The network of FIG. 2, however, can readily apply a differential between the high and low battery voltages either greater or less than the fixed or normal differential between the firing and cease firing voltages of tube 11, depending upon whether contact 90a or contact 90b is used. Only one of the contacts 90a or 90b is used depending upon whether a greater or smaller differential is desired.

When contact 90b is used, a voltage differential across the battery less than the normal voltage differential of tube 11 is provided. When the tube 11 is not firing, contactor 14a is in the up position as shown and all of resistor $R_5$ is in parallel with tube 11. Therefore, the maximum amount of the battery voltage is applied to tube 11, and the applied voltage to tube 11 more nearly approximates the voltage of the battery. When the tube 11 fires, contactor 14a is connected to 90b and immediately reduces the resistance in parallel with tube 11. When the resistance is reduced, the proportion of the voltage applied to the tube 11 is also reduced. Therefore, the battery voltage does not have to decrease as much to reach the lower cease firing voltage of the tube 11 since the difference between the battery voltage and the voltage applied to tube 11 has been increased.

The dual value resistance is adjusted when contact 90b is used by connecting the desired high battery voltage to terminals 3 and 5 and decreasing the resistance of resistor $R_4$ until the tube fires. This causes the circuit through the sliding contact of $R_5$ to close and immediately reduce the voltage applied to tube 11. Then the desired minimum battery voltage is connected to terminals 3 and 5 and the resistor $R_5$ is reduced until the voltage on the tube 11 drops to the cease fire value. Both the high and low values of the resistance are then set and the panel is ready for automatic operation.

When contact 90a is used, the opposite effect is produced and the differential for the battery is greater than the normal differential of the tube 11. When the tube 11 is nonfiring, contactor 14a is in contact with 90a and is therefore closed and the minimum amount of resistor $R_5$ is in parallel with tube 11. Therefore, the battery voltage must reach a higher value to fire tube 11 than would normally be required if there was maximum resistance in parallel with tube 11. Then when tube 11 fires, the contactor 14a is opened (since the lead to contact 90b is disconnected) and the resistance in parallel with tube 11 immediately increases. This immediately increases the voltage applied to tube 11, and the voltage across the battery must fall even further to reach the low cease firing voltage of tube 11. Therefore, a differential between the high and low battery voltage considerably greater than the normal differential between the fire and cease fire voltages of the tube is provided.

When contact 90a is used, the dual value resistance is adjusted to provide the desired battery voltage range by first applying sufficient voltage to fire the tube 11 and open the circuit through the sliding contact of resistor $R_5$. Then the desired low battery voltage is applied to terminals 3 and 5 and the resistance of resistor $R_5$ decreased until the tube 11 stops firing. Then the desired high battery voltage is applied to terminals 3 and 5 and the resistance of resistor $R_5$ in the sliding contact circuit is increased until the voltage applied to tube 11 increases to the firing voltage. Both the high and low values of the resistance are then set and the panel is ready for automatic operation.

As previously mentioned, tube 11 controls the voltage at which the cranking circuit is interrupted to stop the cranking operation of the internal combustion engine. Manually variable resistor $R_3$ is normally adjusted so that tube 12 will fire or commence to conduct when the generator has gained enough speed to generate the lower voltage limit of the battery.

The present embodiment can be used on systems with a supply or battery voltage ranging from 6 to 275 volts direct current. However, when used on systems where the supply voltage reaches a value less than 90 volts D.C., transistorized power converters are required to convert the battery voltage to 115 volts, D.C. Two such power converter components are necessary, one component for the voltage control, the time delay and cranking relay circuits, the other component for the minimum cranking time relay circuit.

I claim:

1. A control circuit for automatically operating an engine driven dynamo to charge and thereby maintain the voltage of a storage battery within desired high and low limits, said control circuit comprising voltage responsive means for energizing a control relay when the high battery voltage limit is reached and for de-energizing said control relay when the low battery voltage limit is reached, said voltage responsive means comprising a conducting device connected in series with said control relay which commences to conduct thereby energizing said relay when a fixed high voltage is applied to said conducting device and continues to conduct as the applied voltage is reduced until a fixed lower voltage is reached when said conducting device ceases to conduct thereby de-energizing said relay, a dual value resistance connected to control the voltage applied to said conducting device, said dual value resistance having a manually adjustable high resistance value and a manually adjustable low resistance value and including means responsive to energization of said relay for automatically changing said resistance from one value to the other thereby changing the voltage applied to said conducting device, circuit means responsive to de-energization of said control relay for cranking the engine, circuit means responsive to starting of the engine for stopping cranking of the engine and circuit means responsive to energization of said relay for stopping operation of the engine.

2. A control circuit as set out in claim 1 wherein said conducting device is a gaseous filled cold cathode tube.

3. A control circuit as set out in claim 2 wherein said dual value resistance comprises a first manually variable resistor connected in series with said tube and a second manually variable resistor connected in parallel with said first resistor only when said tube is not conducting and said relay is de-energized.

4. A control circuit as set out in claim 2 wherein said dual value resistance comprises a first manually variable resistor connected in series with said tube and a second manually variable resistor connected in parallel with said tube only when said tube is conducting and said relay is energized.

5. A control circuit as set out in claim 2 wherein said dual value resistance comprises a first manually variable resistor connected in series with said tube and a second manually variable resistor connected in parallel with said tube only when said tube is not conducting and said relay is de-energized.

No references cited.